(12) United States Patent
Clemen et al.

(10) Patent No.: US 12,320,302 B2
(45) Date of Patent: Jun. 3, 2025

(54) DRIVE SYSTEM FOR AN AIRCRAFT, AIRCRAFT HAVING A DRIVE SYSTEM AND METHOD FOR OPERATING AN AIRCRAFT

(71) Applicant: Rolls-Royce Deutschland Ltd & Co KG, Blankenfelde-Mahlow (DE)

(72) Inventors: Carsten Clemen, Mittenwalde (DE); Thomas Dörr, Berlin (DE)

(73) Assignee: ROLLS-ROYCE DEUTSCHLAND LTD & CO KG, Blankenfelde-Mahlow (DE)

( * ) Notice: Subject to any disclaimer, the term of this patent is extended or adjusted under 35 U.S.C. 154(b) by 0 days.

(21) Appl. No.: 18/484,827

(22) Filed: Oct. 11, 2023

(65) Prior Publication Data

US 2024/0125289 A1 Apr. 18, 2024

(30) Foreign Application Priority Data

Oct. 13, 2022 (DE) ...................... 10 2022 210 807.8

(51) Int. Cl.
*F02C 7/262* (2006.01)
*F02C 3/22* (2006.01)
(Continued)

(52) U.S. Cl.
CPC ............... *F02C 7/262* (2013.01); *F02C 3/22* (2013.01); *F02C 3/24* (2013.01); *F02C 7/22* (2013.01); *F02C 9/40* (2013.01); *F23R 3/28* (2013.01)

(58) Field of Classification Search
CPC .... F02C 7/22; F02C 7/262; F02C 3/22; F02C 3/24; F02C 9/40; F23R 3/28
See application file for complete search history.

(56) References Cited

U.S. PATENT DOCUMENTS 2,971,336 A * 2/1961 Mock ........................ F02C 9/26
91/458
5,069,031 A 12/1991 Shekleton
(Continued)

FOREIGN PATENT DOCUMENTS

| CN | 112709639 A | 4/2021 |
|---|---|---|
| EP | 4095368 A1 | 11/2022 |
| EP | 4123145 A1 | 1/2023 |

OTHER PUBLICATIONS

German Search Report dated Jul. 7, 2023 from counterpart German App No. 10 2022 210 807.8.
(Continued)

*Primary Examiner* — William H Rodriguez
(74) *Attorney, Agent, or Firm* — SHUTTLEWORTH & INGERSOLL, PLC; Timothy J. Klima

(57) ABSTRACT

A drive system for an aircraft which is constructed for operation with a liquid fuel and a gaseous fuel, includes: at least one engine having a combustion chamber for operation with the liquid fuel and/or the gaseous fuel; and per fuel at least one separate tank chamber which is or can be brought into connection in flow terms with the combustion chamber via a fuel line for supplying it with the corresponding fuel. A drive system which is optimized in terms of emissions and efficiency is provided in that the drive system is constructed in such a manner that, in the event of firing at a great height, exclusively gaseous fuel is or can be used in the at least one engine during a firing operation at a great height.

13 Claims, 2 Drawing Sheets

(51) Int. Cl.
*F02C 3/24* (2006.01)
*F02C 7/22* (2006.01)
*F02C 9/40* (2006.01)
*F23R 3/28* (2006.01)

(56) References Cited

U.S. PATENT DOCUMENTS

| | | |
|---|---|---|
| 11,578,871 B1 | 2/2023 | Joshi |
| 11,668,243 B2* | 6/2023 | Muldoon ................ F02C 7/262 60/736 |
| 2007/0277528 A1* | 12/2007 | Homitz .................. F23D 14/08 60/737 |
| 2016/0076461 A1 | 3/2016 | Kawai |
| 2016/0201897 A1 | 7/2016 | Snyder |
| 2022/0178544 A1 | 6/2022 | Durand |
| 2022/0266980 A1* | 8/2022 | Tulloch ................. B64D 37/04 |
| 2022/0306310 A1* | 9/2022 | Sibbach ............. F02M 21/0293 |
| 2022/0381185 A1 | 12/2022 | Muldoon |
| 2023/0015930 A1* | 1/2023 | Meshkin Fam ........ B64D 37/30 |

OTHER PUBLICATIONS

European Search Report dated Mar. 5, 2024 from counterpart EP App No. 23200891.2.

* cited by examiner

DRIVE SYSTEM FOR AN AIRCRAFT, AIRCRAFT HAVING A DRIVE SYSTEM AND METHOD FOR OPERATING AN AIRCRAFT

This application claims priority to German Patent Application 102022210807.8 filed Oct. 13, 2022, the entirety of which is incorporated by reference herein.

The invention relates to a drive system for an aircraft, which is constructed for operation with a liquid fuel and a gaseous fuel. The invention further relates to an aircraft having a drive system and a method for operating the aircraft.

In so-called "dual fuel" drive systems, the combustion chamber and therefore the engine can be operated both with a liquid fuel, for example, kerosene, or the like, and with a gaseous fuel, for example, hydrogen, or the like. The operation can be carried out particularly alternatively, exclusively with the liquid fuel or the gaseous fuel, or simultaneously, with an admixture comprising both fuels.

A gas turbine arrangement having a supply system for a "dual fuel" engine is set out in CN 112 709 639 A.

A nozzle apparatus for a "dual fuel" engine is set out in US 2016/0 201 897 A1.

Generally, the "dual fuel" principle is based on the fact that the combustion chamber is configured so that it can be operated in every operating situation with each of the fuels (alternatively or simultaneously), that is to say, during take-off, cruising, landing and the like, regardless of external conditions, such as pressure, temperature and height. This includes the fact that the engine can start up both with the gaseous fuel and with the liquid fuel, similarly regardless of the external conditions. This also applies to the firing at a great height which is generally carried out in an emergency situation at a great height, for example, at a cruising height of, for example, 30,000 ft.

In order to ensure the reliable ability of the combustion chamber also to fire at a great height at cruising height with the liquid fuel, the combustion chamber must have a specific volume. The necessary volume for the ability of the combustion chamber to fire at a great height is decisive in the configuration for the combustion chamber volume and therefore for the dwell time of the flow within the combustion chamber. A high dwell time in turn results in elevated $NO_x$ (nitrogen oxide) emissions. Furthermore, a great combustion chamber volume increases the spatial requirement in the engine, the weight and the costs of the combustion chamber, and therefore of the entire engine.

An object of the invention is to provide a drive system of the type mentioned in the introduction which is optimized with respect to the emission characteristics and efficiency and a corresponding aircraft and a method for operating the aircraft.

The object is achieved for the drive system, for the aircraft, and, for the method, with features as disclosed herein.

Advantageous variants are set out in the dependent claims.

In the drive system, there is provision according to the invention for the drive system to be constructed in such a manner that, in the event of firing at a great height in a firing operation at a great height in the at least one engine, preferably in all the ("dual fuel") engines which are present in the aircraft, exclusively gaseous fuel is or can be used. Using liquid fuel is impossible.

The firing operation at a great height describes the operation of firing and starting the respective engine in response to a specific operating condition, in particular windmilling, at a great height, for example, at a cruising height of, for example, 30,000 ft, wherein generally external conditions with temperatures of up to −40° C. and from 0.3 bar to 0.4 bar atmospheric pressure are present. The duration of the firing operation at a great height of the respective engine (with, for example, up to 100 klbf full-load thrust) with starting to idling is typically from 60 to 180 seconds.

In this case, in particular a control device, which is associated with the drive system, is configured to control and/or to regulate the firing operation at a great height exclusively with the gaseous fuel, not with the liquid fuel.

The gaseous fuel, for example, hydrogen, methane or a gas admixture which has at least one of these gases, generally has a very much higher reactivity (for example, characterized by a firing delay time or a flame speed) and a substantially greater firing range (for example, characterized by the firing limits) than the liquid fuel, in particular in the form of kerosene. Therefore, the combustion of the gaseous fuel can also be carried out substantially more efficiently at low load points and in the subatmospheric region and at great heights. Conversely, the degree of efficiency of the combustion chamber with kerosene is very low under firing conditions at a great height (<30%) so that large quantities of kerosene remain unburnt. Thus, as a result of the measure proposed according to the invention, the emissions and the efficiency of the drive system particularly during the firing operation at a great height can be optimized. Furthermore, the combustion chamber volume of the combustion chamber can be configured for firing at a great height with the (comparatively) highly reactive gaseous fuel and not for firing at a great height with kerosene. This allows a lower combustion space volume and therefore a combustion chamber with lower structural size, which has a positive effect on the $NO_x$ emissions and weight and spatial requirement of the combustion chamber and therefore the efficiency of the engine.

In a particularly preferred variant, a minimum quantity of gaseous fuel can be or is stored in the drive system and is or can be used exclusively in the event of firing at a great height. The minimum quantity corresponds, preferably precisely, to the quantity with which at least one firing operation at a great height can be or is carried out in the (dual fuel) engine(s) present in the aircraft. It is also possible for the minimum quantity to be configured for another defined number of firing operations at a great height, for example, for two or more firings at a great height. The necessary quantity per engine corresponds to a partial minimum quantity. The total of all the partial minimum quantities results in the minimum quantity. The minimum quantity also preferably is or becomes stored when otherwise no operation with the gaseous fuel is intended for the corresponding flight.

The storage of the minimum quantity is possible, for example, in technical control terms, by obtaining a minimum filling level in the (main) tank chamber for gaseous fuel within the drive system which contains the gaseous fuel for the remaining flight operation.

However, at least one additional tank chamber, which (in the case of firing at a great height) is or can preferably be brought via a separate additional fuel line into connection with the combustion chamber in flow terms, is particularly preferably provided for storing the minimum quantity. The additional tank chamber is particularly arranged separately from the other (main) tank chambers of the drive system. A separate additional valve and/or an additional pressure reduction device is/are preferably arranged inside the additional fuel line. The additional fuel line can be connected to a (main) fuel line of the fuel system inside the drive system.

As a result of the presence of the additional tank chamber and where applicable the separate additional fuel line, a redundancy within the fuel system is advantageously achieved in technical safety terms and simple controllability in emergency situations. The risk of an unplanned removal of the minimum volume for a purpose other than firing at a great height, with excessive emptying of the (main) tank chamber, is dispensed with. Furthermore, as a result of the comparatively compact construction, the additional tank chamber can advantageously be arranged and/or be filled independently of the (main) tank chamber for gaseous fuel for the remaining flight operation.

A defined and space-saving storage of the minimum quantity is enabled when at least one additional tank chamber is provided per available engine (which is intended to be fired during firing at a great height). Preferably, each additional tank chamber contains the partial minimum quantity for firing at a great height of the respective engine with which the additional tank chamber is associated.

An advantageous arrangement is possible if the additional tank chamber is arranged on the respective engine, with which the additional tank chamber is associated (for storing the partial minimum quantity for the corresponding engine) or at another location within the aircraft. Preferably, consequently, the additional tank chamber is arranged separately from the (main) tank chamber for storing the remaining quantity of gaseous fuel. The term "on the engine" is intended to be understood to mean particularly inside the external engine covering.

Preferably, the additional tank chamber is constructed in a pressure-resistant additional tank container. The maximum filling pressure may be, for example, between 300 bar and 700 bar. The pressure tank is preferably not thermally insulated for compact construction.

In a compact and/or weight-optimized construction, the additional tank container is constructed so as to comprise metal, in particular high-grade steel, and/or to include metal, or constructed so as to comprise plastics material, in particular reinforced plastics material (for example, reinforced with glass fibre), for example, polyamide and/or so as to include plastics material.

A contribution to a compact construction is also made if the volume of the where applicable respective additional tank chamber is configured in such a manner that at least, preferably precisely, one partial minimum quantity for carrying out, preferably precisely, at least one firing operation at a great height (or, preferably precisely, two or more firing operations at a great height) in the associated engine, can be or is stored. Consequently, the volume is directed towards the characteristics of the associated engine, in particular the fuel consumption thereof during the firing operation at a great height. As a result of the small size, which is obtained by the configuration orientated in accordance with requirements, of the additional tank chamber, an advantageous total weight saving is possible with a corresponding configuration of the combustion chamber with a reduced combustion chamber volume.

For an advantageous reduction of size and weight, the combustion chamber volume inside the combustion chamber is preferably configured for the firing at a great height with the gaseous fuel, wherein the combustion chamber volume is constructed to be at least 10% smaller, preferably at least 20% or at least 30% smaller, for example, up to 50% smaller, than with a configuration of an equivalent engine (with the same characteristic variables, for example, the thrust) for the firing at a great height with the liquid fuel.

Preferably, the drive system is configured to operate with a kerosene-based and/or kerosene-like fuel as the liquid fuel and/or to operate with hydrogen and/or methane or a gas admixture which has at least one of these gases as the gaseous fuel.

In the method, there is provision according to the invention for, in the event of firing at a great height, exclusively gaseous fuel to be used in the at least one engine during a firing operation at a great height.

In this case, a minimum quantity, which is stored in the drive system, of gaseous fuel is preferably (exclusively) used for the firing operation at a great height.

A comparatively high level of failure prevention is achieved if, in the event of firing at a great height, there is connected in an additional fuel line an additional valve, via which a partial minimum quantity of gaseous fuel as required for the firing operation at a great height of the corresponding engine is directed out of an additional tank chamber to the combustion chamber, wherein in particular the pressure of the fuel is throttled via an interposed additional pressure reduction device to a pressure level which is necessary for the firing at a great height, for example, up to 15 bar excess pressure.

Additional variants of the method are set out accordingly in connection with the variants of the drive system.

The invention will be explained in more detail hereunder by means of exemplary embodiments with reference to the drawings, in which:

FIG. 1 shows a schematic illustration of an aircraft 1 having a drive system 11 which is constructed for operation with a liquid fuel and a gaseous fuel as generally known from the prior art.

Figure 1:
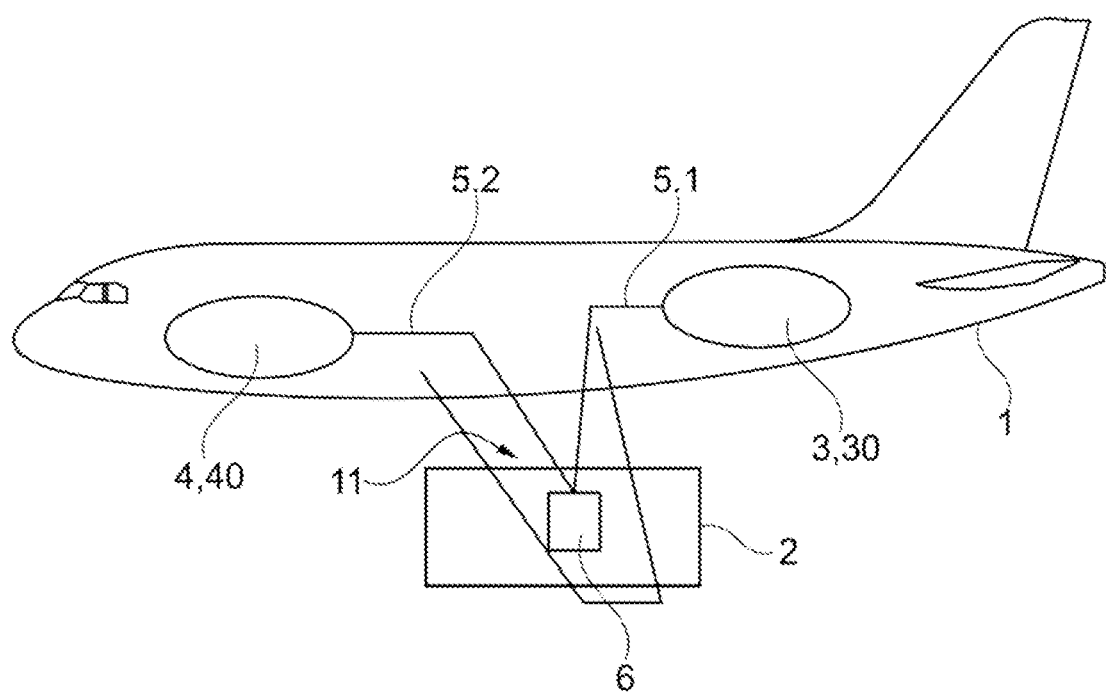
FIG. 1 shows an aircraft having a drive system which is constructed for operation with a liquid fuel and a gaseous fuel according to the prior art as a schematic illustration.

The liquid fuel is particularly a kerosene-based or kerosene-like fuel (that is to say, a fuel comparable with kerosene). The gaseous fuel is particularly hydrogen and/or methane or another highly reactive gas or a gas admixture which has at least one of these gases.

The drive system 11 has for the gaseous fuel a tank chamber 3 in a tank container 30 which is connected in flow terms via a fuel line 5.1 to a combustion chamber 6 of an engine 2 of the drive system 11 for supplying it during operation with the gaseous fuel. For the liquid fuel, the drive system 11 has a tank chamber 4 in a tank container 40 which is connected in flow terms via a fuel line 5.2 to the combustion chamber 6 of the engine 2 for supplying it during operation with the liquid fuel.

The aircraft 1 can be operated both alternatively with one of the two fuels, that is to say, exclusively with the liquid fuel or the gaseous fuel, and simultaneously with an admixture of the two fuels.

For this purpose, at least one engine 2 or generally all the engines 2 present in the drive system 11 of the aircraft is/are in the form of a so-called "dual fuel" engine 2. In this instance, a gas turbine arrangement with the combustion chamber 6 of the respective engine 2 is configured in such a manner that it can be operated in every operating situation with each of the two fuels, that is to say, during take-off, cruising, landing, etc., irrespective of the external conditions, such as pressure, temperature and height. This also includes the fact that the engine 2 can start both with the gaseous fuel and with the liquid fuel, similarly irrespective of the external conditions, that is to say, also at a great height (for example, 30,000 ft), that is to say, during firing at a great height.

In order to ensure reliable firing at a great height of the combustion chamber 6 at a height, for example, of 30,000 ft with the liquid fuel, a combustion space of the combustion chamber 6 must have a comparatively large volume. In order to ensure safe flight operation, the combustion chamber 6 is configured for the emergency situation of firing at a great height, in accordance with which the combustion space volume is directed. Accordingly, the combustion chamber 6 has a comparatively large construction size with a great combustion space volume which has a disadvantageous effect on the $NO_x$ emissions, the spatial requirement in the engine 2, the weight and the costs of the combustion chamber 6 and therefore of the entire engine 2. Furthermore, the degree of efficiency of the combustion chamber 6 in the event of firing with kerosene as the liquid fuel under firing conditions at a great height is very low (less than 30%) so that large quantities of kerosene during the start operation of the engine remain unburnt.

For the benefit of the emission level and the combustion efficiency, it is proposed according to the invention to fire the combustion chamber 6 exclusively with the gaseous fuel in the event of firing at a great height. The gaseous fuel generally has a very much higher reactivity (for example, characterized by a firing delay time or a flame speed) and a substantially greater firing range (for example, characterized by the firing limits) than the liquid fuel so that the combustion of the gaseous fuel can also be carried out substantially more efficiently at low load points and in the sub-atmospheric region and at a great height. Furthermore, the combustion space volume of the combustion chamber 6 can advantageously be configured for firing at a great height with hydrogen or another generally (comparatively) highly reactive fuel and not for firing at a great height with kerosene, which allows a smaller combustion space volume and therefore a combustion chamber 6 with a smaller construction size.

In this case, it is extremely advantageous to ensure in technical safety terms that at any time for each engine 2 which is intended to be fired during firing at a great height a sufficient quantity of gaseous fuel is present, irrespective of how much gaseous fuel is still available for the onward flight.

The sufficient quantity is referred to below as a minimum quantity. The minimum quantity forms the quantity, which is required for firing of all the engines 2 intended to be fired during a firing operation at a great height (or a plurality of firing operations at a great height), of gaseous fuel. In this instance, a corresponding partial minimum quantity is required for firing at a great height of a single engine 2.

The partial minimum quantity for a firing operation at a great height per engine 2 is the quantity which is required in order to achieve firing and start-up of the engine 2 to an idling state and varies depending on the size, in particular thrust, of the engine 2 and the duration of the firing operation at a great height. Typically, a firing operation at a great height (firing and start-up of the engine 2 to an idling state) takes, for example, from 60 seconds to 180 seconds for starting up an engine 2 (with, for example, up to 100 klbf full load thrust).

Figure 2:
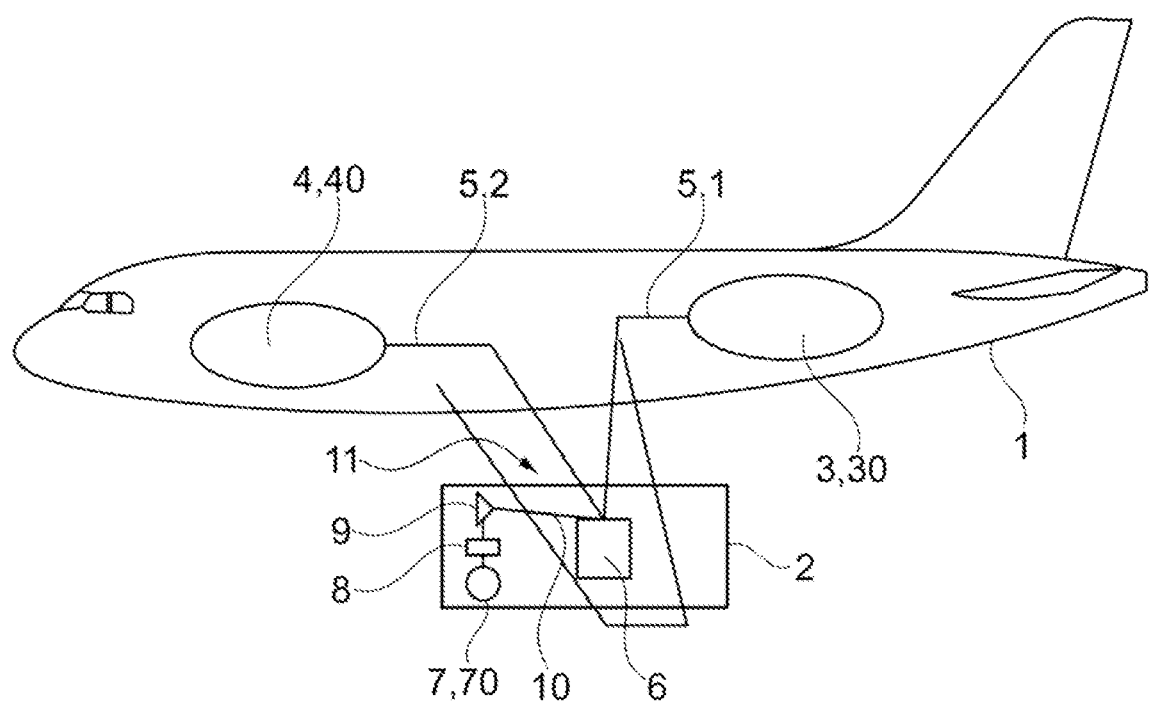
FIG. 2 shows an aircraft according to the invention with a drive system comprising a separate additional tank chamber for storing gaseous fuel for firing at a great height as a schematic illustration.

FIG. 2 shows a construction according to the invention of the aircraft 1 having a drive system 11 which is constructed in such a manner that the minimum quantity of gaseous fuel which is used exclusively in the event of firing at a great height is stored.

In FIG. 2, there is provided according to a preferred variant at least one additional tank space 7 in which the minimum quantity is stored. Preferably, at least one additional tank chamber 7 is present per engine 2 which is intended to be fired during the firing at a great height. The respective additional tank chamber 7 stores the partial minimum quantity which is sufficient for at least one firing operation at a great height of the corresponding engine 2.

The combustion space volume of the combustion chamber 6 is configured for firing at a great height with the gaseous fuel, not for liquid fuel, and consequently has, for example, a combustion space volume which is smaller by at least 10% or 20%, for example, by up to 50%, than a combustion chamber 6 which is configured for the equivalent engine 2 for the firing at a great height with the liquid fuel.

The additional tank chamber 7 can be arranged on the respective engine 2, with which the additional tank chamber is associated (in particular inside the external engine covering) or at a different location within the aircraft 1. The additional tank chamber 7 is preferably arranged separately from the tank chamber 3 and the tank chamber 4.

The additional tank chamber 7 is connected to the combustion chamber 6 via a separate additional fuel line 10. An additional valve 8 and an additional pressure reduction device 9 are arranged in the additional fuel line 10.

In the event of firing at a great height, the additional valve 8 is switched and the flow connection between the additional tank chamber 7 and the combustion chamber 6 is therefore produced by means of the additional fuel line 10. The gaseous fuel is directed to the combustion chamber 6 via the additional fuel line 10, wherein the pressure of the gaseous fuel is throttled via the additional pressure reduction device 9 to a pressure level, which is necessary for the firing, of, for example, up to 15 bar excess pressure.

In the example shown in FIG. 2, the additional tank chamber 7 is constructed in a pressure-resistant additional tank container 70 which is arranged separately from the tank containers 30 and 40, in this case by way of example on the engine 2. In the case of hydrogen as the gaseous fuel, the additional tank container 70 is configured, for example, for a maximum storage pressure between 300 bar and 700 bar. The additional tank container 70 comprises metal, in particular high-grade steel, and/or is constructed so as to include metal. Alternatively, the additional tank container 70 comprises in particular, for example, plastics material which is reinforced with glass fibre, for example, polyamide, and/or is constructed so as to include plastics material.

The volume of the additional tank chamber 7 is configured in such a manner that the partial minimum quantity for at least one firing operation at a great height can be stored. Consequently, the volume of the additional tank chamber 7 is directed towards the characteristics of the engine 2, in particular the fuel consumption thereof during the firing operation at a great height.

By way of example, the necessary partial minimum quantity of hydrogen during a firing operation at a great height for firing and starting up the engine 2 (full-load thrust approximately 20 klbf) to "flight idle" within 90 seconds is approximately 0.8 kg. This corresponds to a hydrogen volume of approximately 20 l at a storage pressure of 700 bar. The additional tank chamber 7 is consequently configured for a volume of approximately 20 l, wherein it may have, for example, a diameter of approximately 20 cm and a length of approximately 70 cm.

For a relatively large engine, for example, the additional tank chamber 7 may be configured to be larger or a plurality of additional tank chambers 7 of the same size may be provided (not shown in FIG. 2).

The size of the additional tank chamber 7 or all the necessary additional tank chambers 7 is so small that, when the combustion chamber 6 is configured with the reduced combustion space volume in total, a total weight saving is possible.

The storage of the minimum quantity is also possible in technical control terms by obtaining a minimum filling level in the tank chamber 3, wherein no additional tank chamber 7 is present (not shown in FIG. 2).

By means of the modified construction of the drive system 11 in relation to the ability to fire at a great height not for both fuels, but instead only with the gaseous fuel, it is possible to configure the combustion chamber 6 with a substantially reduced volume. This is associated with a decreasing dwell time of the air/fuel admixture within the combustion chamber 6 and consequently a reduction of the $NO_x$ emissions. Furthermore, the engine weight and associated costs can be reduced.

LIST OF REFERENCE NUMERALS

1 Aircraft
2 Engine
3 Tank chamber
30 Tank container
4 Tank chamber
40 Tank container
5.1 Fuel line
5.2 Fuel line
6 Combustion chamber
7 Additional tank chamber
70 Additional tank container
8 Additional valve
9 Additional pressure reduction device
10 Additional fuel line
11 Drive system

The invention claimed is:

1. A drive system for an aircraft that is constructed for operation with a liquid fuel and a gaseous fuel, comprising:
   at least one engine having at least one combustion chamber for operation with the liquid fuel and/or the gaseous fuel and
   for each of the liquid fuel and the gaseous fuel, at least one separate tank chamber which is flowingly connectable with the at least one combustion chamber via a respective fuel line for supplying the at least one combustion chamber with the respective fuel,
   wherein the drive system is constructed such that, in the event of firing at a great height, exclusively gaseous fuel is used in the at least one combustion chamber during a firing operation at a great height;
   at least one additional tank chamber configured for storing at least a minimum quantity of the gaseous fuel to be used exclusively during the firing operation at the great height;
   an additional fuel line separate from the respective fuel lines and connecting the at least one additional tank chamber to the at least one combustion chamber;
   an additional valve configured and positioned to selectively control flow of the gaseous fuel from the at least one additional tank chamber to the at least one combustion chamber;
   wherein the drive system is configured:
   to operate with a kerosene-based fuel or a kerosene-like fuel as the liquid fuel; and
   to operate with hydrogen or methane or a gas admixture which has at least one of hydrogen and/or methane as the gaseous fuel;
   wherein a combustion chamber volume inside the at least one combustion chamber is configured for the firing operation at the great height with the gaseous fuel, and
   wherein the combustion chamber volume is constructed to be at least 10% smaller, than with a configuration of an equivalent engine for the firing operation at the great height with the liquid fuel;
   wherein the gaseous fuel supplied for the firing at great height comes from the at least one additional tank chamber.

2. The drive system according to claim 1, wherein the at least one additional tank chamber includes an additional tank chamber per each of the at least one engine.

3. The drive system according to claim 1, wherein the at least one additional tank chamber is arranged on the respective each of the at least one engine to which the minimum quantity is supplied.

4. The drive system according to claim 1, wherein the at least one additional tank chamber is constructed in a pressure-resistant additional tank container.

5. The drive system according to claim 4, wherein the additional tank container:
   is constructed to comprise metal, or
   is constructed to comprise a plastic material.

6. The drive system according to claim 1, wherein a volume of the at least one additional tank chamber is sufficient to contain a quantity of the gaseous fuel sufficient to carry out at least one firing operation at the great height in the at least one engine.

7. An aircraft including the drive system according to claim 1.

8. The drive system according to claim 1, wherein the combustion chamber volume is constructed to be at least 20% smaller than with the configuration of the equivalent engine for the firing at the great height with the liquid fuel.

9. The drive system according to claim 1, wherein the combustion chamber volume is constructed to be at least 30% smaller than with the configuration of the equivalent engine for the firing at the great height with the liquid fuel.

10. The drive system according to claim 1, wherein the combustion chamber volume is constructed to be up to 50% smaller than with the configuration of the equivalent engine for the firing at the great height with the liquid fuel.

11. A method for operating an aircraft, comprising:
    providing a drive system for an aircraft that is constructed for operation with a liquid fuel and a gaseous fuel, comprising:
    at least one engine having at least one combustion chamber for operation with the liquid fuel and/or the gaseous fuel and
    for each of the liquid fuel and the gaseous fuel, at least one separate tank chamber which is flowingly connectable with the at least one combustion chamber via a respective fuel line for supplying the at least one combustion chamber with the respective fuel, wherein the drive system is constructed such that, in the event of firing at a great height, exclusively gaseous fuel is used in the at least one combustion chamber during a firing operation at a great height;

at least one additional tank chamber configured for storing at least a minimum quantity of gaseous fuel to be used exclusively during the firing operation at great height;

an additional fuel line separate from the respective fuel lines and connecting the at least one additional tank chamber to the at least one combustion chamber;

an additional valve configured and positioned to selectively control flow of the gaseous fuel from the at least one additional tank chamber to the at least one combustion chamber;

supplying the at least one combustion chamber, alternatively or simultaneously with the liquid fuel and the gaseous fuel, via a fuel line from the respective at least one separate tank chambers, wherein in the event of the firing at the great height, using exclusively gaseous fuel in the at least one engine during the firing operation at the great height;

operating the drive system with a kerosene-based fuel or a kerosene-like fuel as the liquid fuel; and operating the drive system with hydrogen or methane or a gas admixture which has at least one of hydrogen and/or methane as the gaseous fuel;

providing that a combustion chamber volume inside the at least one combustion chamber is configured for the firing operation at the great height with the gaseous fuel, and providing that the combustion chamber volume is constructed to be at least 10% smaller, than with a configuration of an equivalent engine for the firing operation at the great height with the liquid fuel;

supplying the gaseous fuel for the firing at great height from the at least one additional tank chamber.

12. The method as claimed in claim 11,
wherein a minimum quantity, which is stored in the drive system, of gaseous fuel is used for the firing operation at the great height.

13. The method as claimed in claim 11,
wherein in the event of the firing at the great height, connecting the additional fuel line with the additional valve, via which a partial minimum quantity of gaseous fuel as required for the firing operation at the great height is directed out of the at least one additional tank chamber to the at least one combustion chamber, and throttling a pressure of the gaseous fuel via an interposed additional pressure reduction device to a pressure level which is necessary for the firing at the great height.

* * * * *